(12) United States Patent
Cote et al.

(10) Patent No.: US 11,731,516 B2
(45) Date of Patent: Aug. 22, 2023

(54) METHOD OF DYNAMIC SPEED MODULATION IN EXTENDED BRAKING APPLICATIONS IN ELECTRIC VEHICLES

(71) Applicant: Prairie Machine & Parts Manufacturing—Partnership, Saskatoon (CA)

(72) Inventors: Dave Cote, Vanscoy (CA); Chris Chahley, Martensville (CA); William Hughes, Saskatoon (CA)

(73) Assignee: Prairie Machine & Parts Manufacturing-Partnership, Saskatoon (CA)

( * ) Notice: Subject to any disclaimer, the term of this patent is extended or adjusted under 35 U.S.C. 154(b) by 526 days.

(21) Appl. No.: 16/809,236

(22) Filed: Mar. 4, 2020

(65) Prior Publication Data

US 2021/0276426 A1 Sep. 9, 2021

(51) Int. Cl.
| | |
|---|---|
| *B60L 7/18* | (2006.01) |
| *B60L 50/60* | (2019.01) |
| *B60L 15/20* | (2006.01) |
| *B60L 53/00* | (2019.01) |
| *B60L 58/12* | (2019.01) |

(52) U.S. Cl.
CPC ............ *B60L 7/18* (2013.01); *B60L 15/2009* (2013.01); *B60L 50/66* (2019.02); *B60L 53/00* (2019.02); *B60L 58/12* (2019.02); *B60L 2240/12* (2013.01); *B60L 2240/545* (2013.01)

(58) Field of Classification Search
None
See application file for complete search history.

(56) References Cited

U.S. PATENT DOCUMENTS

| 2013/0035817 A1* | 2/2013 | Bahar | B60K 6/46 701/22 |
| 2016/0243958 A1* | 8/2016 | Miller | B60L 15/2018 |
| 2021/0155240 A1* | 5/2021 | Hashimoto | B60L 3/108 |

\* cited by examiner

*Primary Examiner* — Todd Melton
*Assistant Examiner* — Jason R Roberson
(74) *Attorney, Agent, or Firm* — Crowe & Dunlevy, P.C.

(57) ABSTRACT

A method of dynamic speed modulation in extended braking applications in a battery-powered electric vehicle is disclosed. The method includes determining a sensed parameter of the battery, and determining a parameter threshold of the battery. If the sensed parameter of the battery is the same or exceeds the parameter threshold, decreasing the groundspeed of the vehicle to a predetermined safe speed. If the sensed parameter of the battery is below the parameter threshold, determining the change in the parameter which would be caused by the regenerative braking system at the current groundspeed of the vehicle. If the change in the parameter would cause the sensed parameter to remain, reach or exceed the parameter threshold, correspondingly decreasing or increasing the groundspeed of the vehicle to cause the sensed parameter to approximate but not exceed the parameter threshold of the battery. A controller and electric vehicle capable of same, are also disclosed.

20 Claims, 4 Drawing Sheets

METHOD OF DYNAMIC SPEED MODULATION IN EXTENDED BRAKING APPLICATIONS IN ELECTRIC VEHICLES

BACKGROUND OF THE INVENTION

1. Field of the Invention

This invention is in the field of battery-powered electric vehicles including regenerative braking systems, and more specifically relates to a method and controls for the dynamic speed modulation of such a vehicle in extended braking applications, such as extended downhill running and the like.

2. Description of the Related Art

Electric vehicles can use regenerative braking while traveling downhill to maintain a constant speed. There are a number of advantages to this approach, including the reduction or elimination in the consumption of break friction material, as well as the capability for energy to be recovered and stored in the battery pack or module of the vehicle.

When the battery pack approaches a fully charged state, however, it cannot readily accept additional energy. This results in reduced motor regenerative torque, and the potential for increased vehicle speed, to the point of runaway and loss of control. If there were method of controlling or operating such an electric vehicle as the battery approaches the fully charged state without a reduction in the motor regenerative torque, it is believed that this would be desirable and commercially beneficial.

The prior art acknowledges the use of kinetic energy from regenerative brakes to charge the power system in an electric vehicle, albeit requiring or encompassing operation of the motors at a diminished torque to reduce overcharging of the battery. A number of attempts have been made to address the potential to overcharge the battery on such an electric vehicle. One solution to prevent the batteries from reaching full capacity is to simply not charge them to 100%. Another known solution is to incorporate a braking resistor capable of dissipating the full regenerative braking power of the vehicle. However, charging to less than 100% does not address other reasons why the battery should not be accepting a charge, such as its operating temperature or cell resistance. It also can limit the ability of the vehicle to balance the cells to ensure battery health and long-term performance. A third solution is to simply stop using generative braking, and instead, rely on friction brakes.

Where braking resistors are employed, with variations in vehicle speed, vehicle weight and slope grades (for example traveling downhill) it can be possible to exceed the power capacity of the vehicle and its breaking resistor. This presents a productivity and safety issue.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In one aspect, the invention provides a method of dynamic speed modulation in extended braking applications in a battery-powered electric vehicle, where the electric vehicle comprises: at least one electric motor operatively connected to a drive train of the vehicle; a rechargeable battery for supply of power to the at least one electric motor; a regenerative braking system operatively connected to the at least one electric motor which progressively limits the groundspeed of the vehicle and provides recharging power to the battery; and a controller with control software. The control software is capable of monitoring a sensed parameter of the battery and the current groundspeed of the vehicle; determining a change in the parameter which would be caused by the regenerative braking system at the current groundspeed of the vehicle; and adjusting the current groundspeed of the vehicle between zero and a maximum operating groundspeed.

During operation of a power system of the vehicle, the method comprising using the controller to continually execute the steps of: determining the sensed parameter of the battery; determining a parameter threshold of the battery. If the sensed parameter of the battery is the same or exceeds the parameter threshold, decreasing the groundspeed to a predetermined safe speed. If the sensed parameter of the battery is below the parameter threshold, determining the change in the parameter which would be caused by the regenerative braking system at the current groundspeed of the vehicle. If the change in the parameter would cause the sensed parameter to reach or exceed the parameter threshold, decreasing the groundspeed of the vehicle to one at which the change in the parameter caused by the regenerative braking system would cause the sensed parameter to approximate but not exceed the parameter threshold of the battery. If the change in the parameter would cause the sensed parameter to remain within the parameter threshold, increasing the groundspeed of the vehicle to one at which the change in the parameter caused by the regenerative braking system would cause the sensed parameter to approximate but not exceed the parameter threshold of the battery and which does not exceed the maximum operating groundspeed.

In another aspect, the invention provides a controller for use in association with a power system of a battery-powered electric vehicle to achieve dynamic speed modulation in extended braking applications. The power system of the electric vehicle comprises: at least one electric motor operatively connected to a drive train of the vehicle; a rechargeable battery for supply of power to the at least one electric motor; and a regenerative braking system operatively connected to the at least one electric motor which progressively limits the groundspeed of the vehicle and provides recharging power to the battery. The controller contains a processor and control software and is operatively connected to the power system of the electric vehicle so as to be capable of: monitoring the sensed parameter of the battery, and the current groundspeed of the vehicle; determining a change in the parameter which would be caused by the regenerative braking system at the current groundspeed of the vehicle; and adjusting the current groundspeed of the vehicle between zero and a maximum operating groundspeed.

The controller, during operation of the vehicle, facilitates the dynamic speed modulation in extended braking applications by continually executing the steps of: determining the sensed parameter of the battery; determining a parameter threshold of the battery. If the sensed parameter of the battery is the same or exceeds the parameter threshold, reducing the maximum groundspeed to a predetermined safe speed. If the sensed parameter of the battery is below the parameter threshold, determining the change in the parameter which would be caused by the regenerative braking system at the current groundspeed of the vehicle. If the change in the parameter would cause the sensed parameter to reach or exceed the parameter threshold, decreasing the groundspeed of the vehicle to one at which the change in the parameter caused by the regenerative braking system would cause the sensed parameter to approximate but not exceed the parameter threshold of the battery. If the change in the parameter would cause the sensed parameter to remain within the parameter threshold, increasing the groundspeed of the vehicle to one at which the change in the parameter caused by the regenerative braking system would cause the sensed parameter to approximate but not exceed the parameter threshold of the battery and which does not exceed the maximum operating groundspeed.

In a further aspect, the invention provides a battery powered electric vehicle configured to achieve dynamic speed modulation in extended braking applications, said vehicle comprising: at least one electric motor operatively connected to a drive train of the vehicle; a rechargeable battery for supply of power to the at least one electric motor; and a regenerative braking system operatively connected to the at least one electric motor which progressively limits the groundspeed of the vehicle and provides recharging power to the battery; and a controller for use in association with a power system of the vehicle comprising a processor and associated control software, being operatively connected to the power system of the electric vehicle so as to be capable of: monitoring a sensed parameter of the battery, and the current groundspeed of the vehicle; determining a change in the parameter which would be caused by the regenerative braking system at the current groundspeed of the vehicle; and adjusting the current groundspeed of the vehicle between zero and a maximum operating groundspeed.

The controller, during operation of the vehicle, facilitates the dynamic speed modulation in extended braking applications by continually executing the steps of: determining the sensed parameter of the battery; determining a parameter threshold of the battery. If the sensed parameter of the battery is the same or exceeds the parameter threshold, decreasing the groundspeed to a predetermined safe speed. If the sensed parameter of the battery is below the parameter threshold, determining the change in the parameter which would be caused by the regenerative braking system at the current groundspeed of the vehicle. If the change in the parameter would cause the sensed parameter to reach or exceed the parameter threshold, decreasing the groundspeed of the vehicle to one at which the change in the parameter caused by the regenerative braking system would cause the sensed parameter to approximate but not exceed the parameter threshold of the battery. If the change in the parameter would cause the sensed parameter to remain within the parameter threshold, increasing the groundspeed of the vehicle to one at which the change in the parameter caused by the regenerative braking system would cause the sensed parameter to approximate but not exceed the parameter threshold of the battery and which does not exceed the maximum operating groundspeed.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
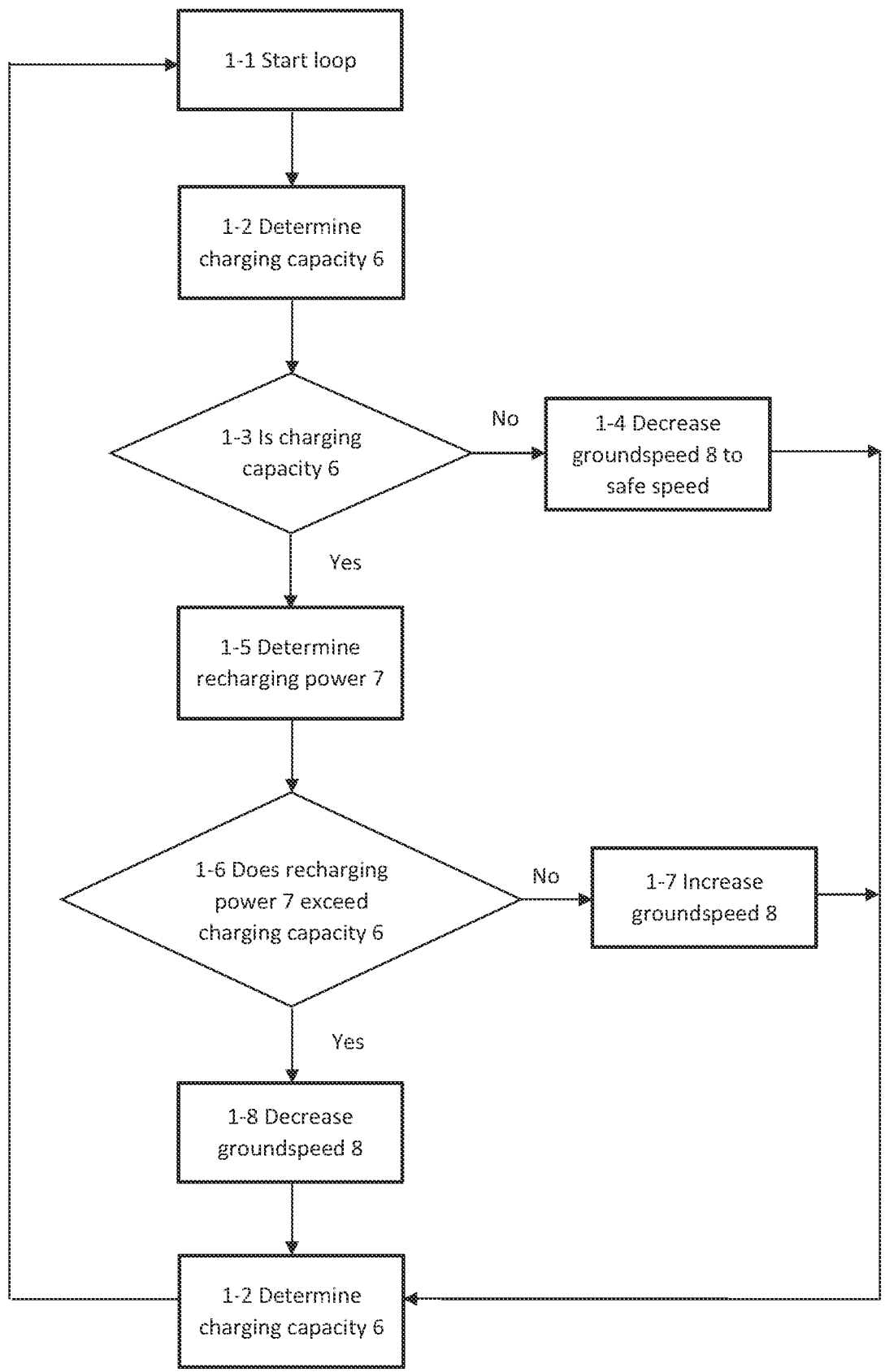
FIG. 1 is a flow chart demonstrating the steps in accordance with an illustrative embodiment of the invention disclosed herein.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As outlined above, disclosed herein is a method of dynamic speed modulation in a battery-powered electric vehicle in extended braking applications, such as downhill running and the like, to avoid power system damage to the vehicle by application of regenerative braking at excessive groundspeeds, while permitting full torque operation of the motors on the vehicle during governed running of the motors.

It is specifically contemplated that the method and the apparatus outlined herein would be useful in electric vehicle applications where safety is a key element of operation, as well as where power system failures requiring repair are problematic as the distance of the vehicle from a maintenance base extends. For example, in underground mining applications, electric vehicles can travel down extended ramps for large distances underground. If battery failure or power system repair of the vehicle took place a long way from the operating base of the vehicle underground, that could require the travel of maintenance assets through many miles of underground tunnels away from the point of failure.

One of the primary extended braking applications contemplated under the method of the invention is in extended downhill running applications, including mining applications and the like. It will be understood, however, that any number of different applications and types of battery-powered electric vehicles would be encompassed within the intended scope of the invention. As well, virtually any type of a battery-powered electric vehicle within the scope of that defined herein, that encompasses a regenerative braking system, could be benefited by the installation of a control environment and control system in accordance with the invention.

Method Overview:

As outlined above, the invention comprises a method of dynamic speed modulation for use in extended braking applications in a battery-powered electric vehicle. Operation of the vehicle in accordance with the method of the invention results in the avoidance of power system damage from excessive regenerative braking power generation or application to the battery of the vehicle, and permits the operation of the vehicle at full motor torque even when the speed of the vehicle is governed to limit the regenerative braking application to the battery.

As described throughout, the method of the invention is effectively achieved by the incorporation of a controller with software capable of applying the control method of the invention within the power and control system of the electric vehicle.

The controller, as described in further detail below, includes a processor and control software instructions thereon which are capable of monitoring a sensed parameter of the battery, and the current groundspeed of the vehicle, calculating or determining a change in the parameter which would be caused by the regenerative braking system at the current groundspeed the vehicle, and adjusting the current groundspeed of the vehicle, between zero and a maximum operating groundspeed.

The method will effectively be achieved by operation of the controller during operation of the power system of the vehicle to conduct a continuous and real time monitoring and control loop as outlined below.

This controller may be part of an electric vehicle, as also described in further detail below. The electric vehicle includes at least one electric motor operatively connected to a drive train of the vehicle, a rechargeable battery for supply of power to the at least one electric motor, and a regenerative braking system operatively connected to the at least one electric motor which progressively limits the groundspeed of the vehicle and provides power to the battery. "Recharging power" is used herein to refer to the power that would be produced by the regenerative braking system at the current groundspeed of the vehicle.

The method generally comprises using the controller to continually execute the steps of: determining the sensed parameter of the battery, determining a parameter threshold of the battery. If the sensed parameter of the battery is the same or exceeds the parameter threshold, the method includes decreasing the groundspeed to a predetermined safe speed. If the sensed parameter of the battery is below the parameter threshold, the method includes determining the change in the parameter which would be caused by the regenerative braking system at the current groundspeed of the vehicle. If the change in the parameter would cause the sensed parameter to reach or exceed the parameter threshold, the method includes decreasing the groundspeed of the vehicle to one at which the change in the parameter caused by the regenerative braking system would cause the sensed parameter to approximate but not exceed the parameter threshold of the battery. If the change in the parameter would cause the sensed parameter to remain within the parameter threshold, increasing the groundspeed of the vehicle to one at which the change in the parameter caused by the regenerative braking system would cause the sensed parameter to approximate, but not exceed, the parameter threshold of the battery. In such a case, the groundspeed does not exceed the maximum operating groundspeed.

In the embodiment shown in FIG. 1, the sensed parameter of the battery is a current energy level of the battery, the change in the parameter of the battery is the recharging power which would be produced by the regenerative braking system at the current groundspeed of the vehicle, and the parameter threshold of the battery is a maximum energy level that the battery can safely contain. In such applications, the difference between the maximum energy level and the current energy level of the battery is a referred to herein as the "charging capacity" of the battery, or the maximum amount of additional energy the battery is capable of safely receiving at a given time.

Typically, the regenerative braking system will apply torque to the motor to limit the groundspeed of the vehicle. This braking generates or provides recharging power that may be stored in the battery. The controller outlined above would be connected also to the control system or power system of the vehicle to permit the monitoring, calculating, and of adjusting control functions outlined above.

Referring back to FIG. 1, FIG. 1 illustrates one example of the monitoring or method loop which could be effected or achieved by the controller. The opening of the monitoring loop is shown at step 1-1. The controller, shown at step 1-2 of the monitoring loop, would determine the charging capacity 6 at that present time, that being the maximum amount of additional energy that the battery is capable of safely receiving at that time. This would be done by the controller 5 in conjunction with the battery and other components of the control or power system on the vehicle 1 by testing the amount of charging or additional energy that the batteries are capable of receiving at that time (i.e. the inverse of the current filled capacity of the battery at that time). The charging capacity, or the maximum additional energy that the batteries can safely receive, can be determined based on many measured and calculated parameters, such as battery state of charge, voltage, and temperature.

For example, the available recharging power may be determined by counting battery current (which is measured with a current sensor) over time. Several temperature sensors are distributed within the battery module to determine maximum and minimum cell temperatures. A battery management system measures each cell voltage within the battery with voltage sensors. Internal resistance is calculated as the cell voltages change with changes in battery current.

The term Charge Current Limit (CCL) is often used when determining how much regenerative current can be supplied to the battery safely. CCL can be reduced if the state of charge is high, if the battery temperature is high or low, or if the calculated cell resistance is high. Once the CCL is determined, it is compared to the optimal CCL. The optimal CCL is a CCL which allows charging at a rate that will prevent over-charging any cell within the tolerance of the time steep control loop.

If the charging capacity 6 is zero (i.e. if the batteries are incapable of receiving any additional energy at the present time) then the controller 5, via its connection to the remainder of the control system of the vehicle 1, adjusts or reduces the groundspeed 8 of the vehicle down to a predetermined safe (minimum) speed.

For example, while traveling downhill, the regenerative braking applies torque to the motor to slow and/or to maintain a predefined safe speed limit. In some applications, this safe minimum speed limit may be between, and including, 0 km/hr to 6 km/hr. The safe speed limit is determined by the rate of power dissipation of the vehicles systems and brake resistor, compared the slope of the hill, weight of the vehicle, and speed of the vehicle.

The testing of the charging capacity 6 is shown at decision block 1-3 in the diagram, and the reduction of groundspeed of the vehicle to the safe minimum speed is shown at 1-4. If the controller triggers the reducing of maximum groundspeed 8 down to the safe (minimum) speed, the continuation of the control or monitoring loop is also shown.

If the charging capacity 6 of the battery at the time of testing is more than zero, the NO leg of the 1-3 decision block would be followed. The controller 5 at that point would determine the (available) recharging power 7, shown at 1-5 (which is the power that would be produced by the regenerative braking system at the current groundspeed of the vehicle).

Following the determination of the available recharging power 7, the next step in the method is to determine whether the recharging power 7 exceeds the charging capacity 6 (i.e. at the current groundspeed the vehicle, will the regenerative brakes produce more power than the batteries are capable of safely receiving). This decision block is shown at 1-6. If it is determined by the controller that the available recharging power 7 (produced by the regenerative brakes) does not exceed the charging capacity 6 of the battery (i.e. the additional energy that the battery can safely receive), this is an indicator that the groundspeed of the vehicle could, if desired by the operator, be increased. The controller may then increase the groundspeed 8 of the vehicle to a speed at which the recharging power 7 produced by the regenerative brakes will be closer to approximate the charging capacity 6 of the battery. Increasing the groundspeed 8 of the vehicle is shown at step 1-7. It is understood that the groundspeed of the vehicle corresponds to, or is proportional to, the recharging power 7 produced by the regenerative brakes.

In that regard, the higher/increased maximum groundspeed may be determined through calculation of a new CCL. As CCL is increased, the maximum allowable groundspeed may also be increased. For example, if CCL goes from 200 amps to 250 amps, the maximum allowable ground speed may increase from 10 km/h to 13 km/h. The top end of the range of the desired maximum speed of a vehicle may be around 30 km/h. Traveling faster than this while on steep grades may be dangerous for the vehicle and the driver.

If the recharging power 7 produced by the regenerative brakes does exceed the charging capacity 6 of the batteries), the groundspeed 8 of the vehicle could be adjusted by the controller, shown at 1-8, to decrease to a point that the recharging power 7 produced by the regenerative brakes would approximate or be equal to the charging capacity 6 of the batteries. In other words, if the CCL is reduced, the speed limit of the vehicle would also be reduced.

For example, in some applications, the math of the control software might be adjusted to also capture scenarios in which the available recharging power 7 approximates or is reaching the maximum recharging capacity 6 without exceeding it.

The continuation of the controller monitoring loop is shown at 1-9. This method would be applied or executed by the controller in conjunction with the remainder of the components of the vehicle during the operation of the power system of the vehicle.

Figure 2:
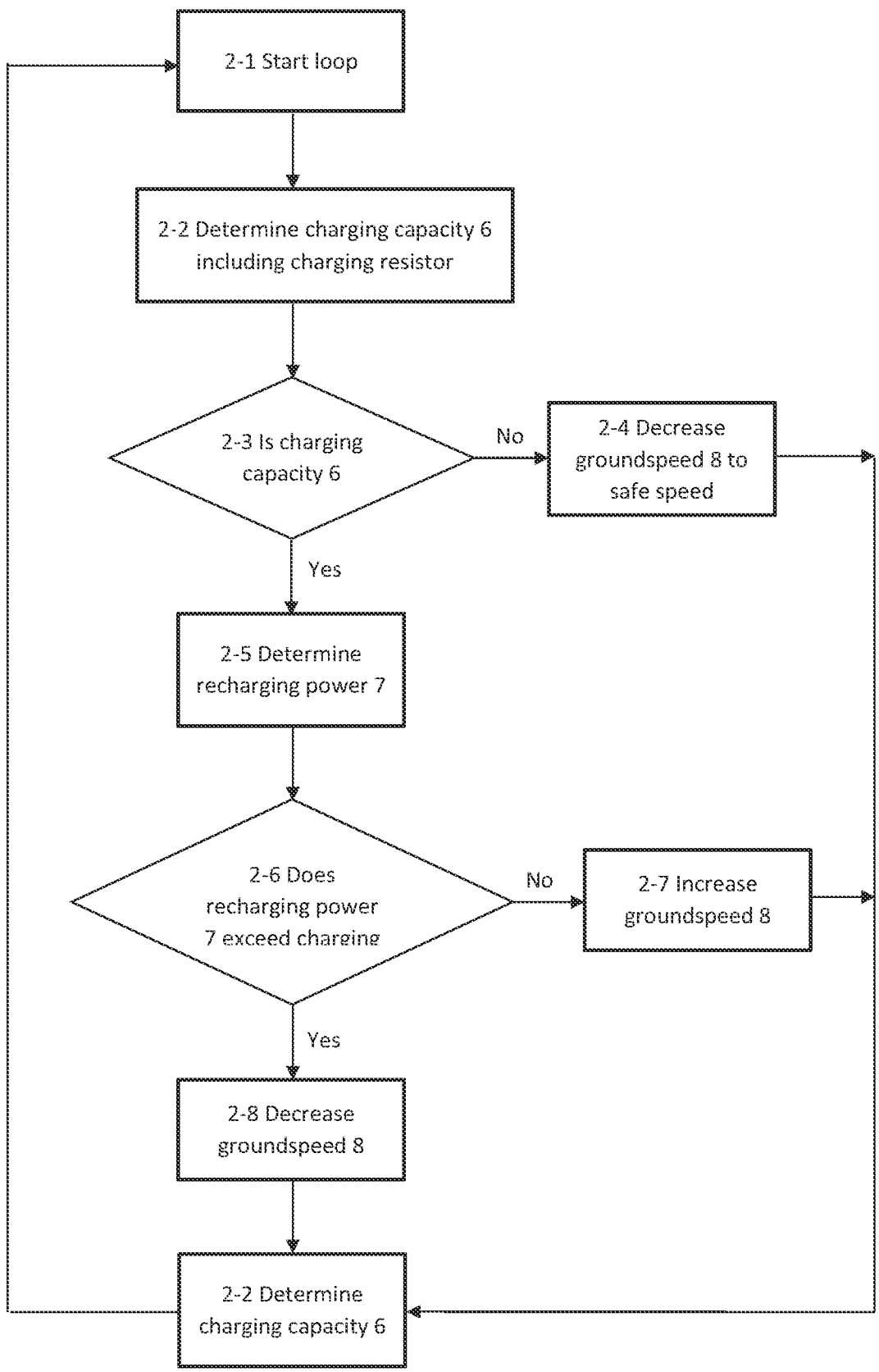
FIG. 2 is a flow chart demonstrating the steps in accordance with another illustrative embodiment of the invention disclosed herein on a vehicle including a charging resistor.

FIG. 2 demonstrates an alternate approach to the method with a different type of vehicle, namely a battery-powered electric vehicle that includes a charging resistor to deplete excess power from the regenerative braking system. The charging resistor may also be referred to as a brake resistor to deplete power from the battery. It may simply be an electric resistor that turns stored energy into heat.

FIG. 2 is the same as FIG. 1 in terms of the steps of the method, except that it shows at step 2-2 that the depletion capacity of the charging resistor is incorporated into the calculation of the charging capacity 6, i.e. the additional energy the batteries can safely receive. The charging resistor may be included for depletion of excess recharging power. When the vehicle includes the charging resistor, the controller may limit the groundspeed of the vehicle once recharging power 7 exceeds the aggregate of the charging capacity 6 and the amount of recharging power which the charging resistor can receive and deplete.

The remainder of the method will operate similarly to that of FIG. 1.

In one example, a 2000 kg vehicle that is traveling down a 20% grade will experience 2000*0.20*9.81=3924 N of force due to the acceleration due to gravity. If the vehicle was traveling at 2 m/s, it would experience a mechanical power of 3924*2=7848 W.

Assuming that the vehicle can convert 75% of that to battery power, 7848*0.75=5886 W of that power that would go to charging the battery and/or be dissipated through the brake resistor. The other 25% of the power would be consumed through losses like rolling resistance, aerodynamic drag, viscous drag, gear losses, electrical losses and operating any other electrical equipment on the vehicle.

In such conditions, a 5886 W brake resistor could be used to maintain the vehicle at 2 m/s, for example. If the vehicle speed was allowed to be 8 m/s, then the power required would be over 23 kW. If the battery was in optimal condition, regenerating 23 kW and maintaining that speed would generally not be a problem However, if the battery was full, cold, hot, or had a high internal resistance, then 23 kW cannot be safely stored in the battery, since it will be full in a short period of time or it will exceed its charge current limit. In this manner, adaptive speed control may be used to keep the power level lower when the battery cannot be charged at higher rates.

Further embodiments of the method could be created which permit the incorporation of inputs to the controller such that the controller could determine or factor in the application of a secondary braking system on a particular electric vehicle. Application of the secondary braking system in an electric vehicle may result in less of a need for regenerative braking to be applied. It will be understood that the calculations executed by the software on the controller could be modified by those skilled in the art to accommodate testing for the application of the secondary braking system during the monitoring loop such as that shown in FIG. 1 and FIG. 2.

In another embodiment of the method (not shown in the Figures), rather than monitoring and determining the current energy level of the battery, the charging capacity of the battery, and the recharging power produced by the regenerative braking system, the method may instead by performed based on the temperature of the battery.

In that regard, the sensed parameter of the battery would be the temperature of the battery. The change in the parameter of the battery would be the change in temperature of the battery which would be caused by the regenerative braking system at the current groundspeed of the vehicle. And the parameter threshold of the battery would be a maximum allowable safe temperature of the battery.

Figure 3:
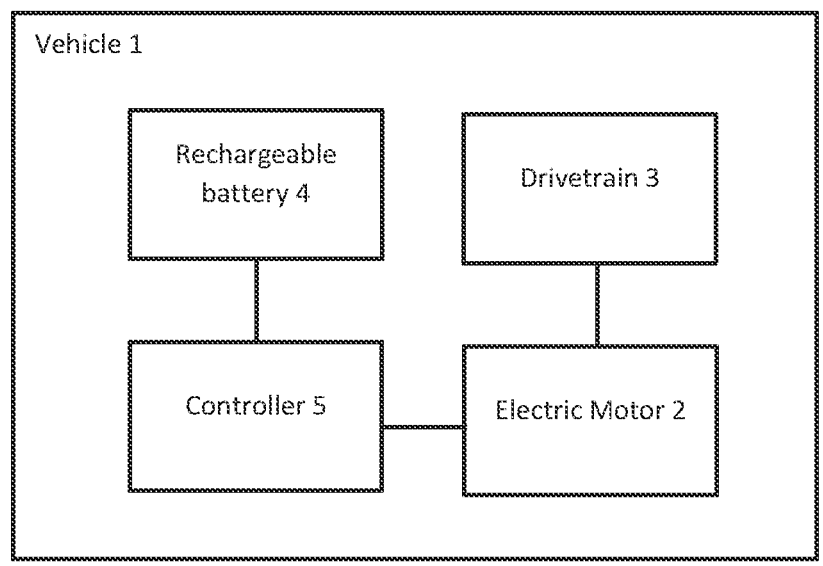
FIG. 3 is a schematic diagram of an electric in accordance with an illustrative embodiment of the invention disclosed herein.

Vehicle:

FIG. 3 is a schematic drawing of the key components of the power and control system of a battery-powered electric vehicle 1 in accordance with an aspect of the invention. The vehicle platform comprises at least one electric motor 2 operatively connected to the drivetrain 3 of the vehicle 1. A rechargeable battery 4 is also shown. The vehicle 1 includes a regenerative braking system 10 which is operatively connected to the at least one electric motor 2 and which is configured to limit the groundspeed of the vehicle and provide recharging power to the battery 4. The controller 5 of the invention is also shown. The controller 5 is operatively connected to the power control bus of the vehicle or otherwise to the necessary electrical and control components. It will be understood that there are numerous different combinations, configurations and types of battery-powered electric vehicles could be encompassed within the scope of the invention and all are contemplated within the scope hereof.

The vehicle 1, via operation of the controller 5 when the vehicle 1 is powered and operating, will operate in accordance with the method of the invention as outlined above.

The controller 5 could be manufactured as part of a new electric vehicle on an OEM basis, or the electric vehicle 1 could be a pre-existing electric vehicle, in which the controller 5 would be retrofitted to permit the practice of the method of the invention in accordance with the pre-existing vehicle. Both such approaches are contemplated within the scope of the invention.

Controller:

Controller 5 could be incorporated into new or existing vehicles. The controller 5 will comprise a hardware component capable of connection with the remainder of the power system of a battery-powered electric vehicle to permit the practice of the method of the invention.

The design of programmable logic controllers, hardware controllers and related software for the control of various industrial machinery, vehicles and the like will be understood by those skilled in the art and the specifics of the hardware will be understood to potentially vary. The controller 5 will effectively comprise a capable processor with associated memory and processor instructions including control software for the facilitation of the method of the invention thereon.

Figure 4:
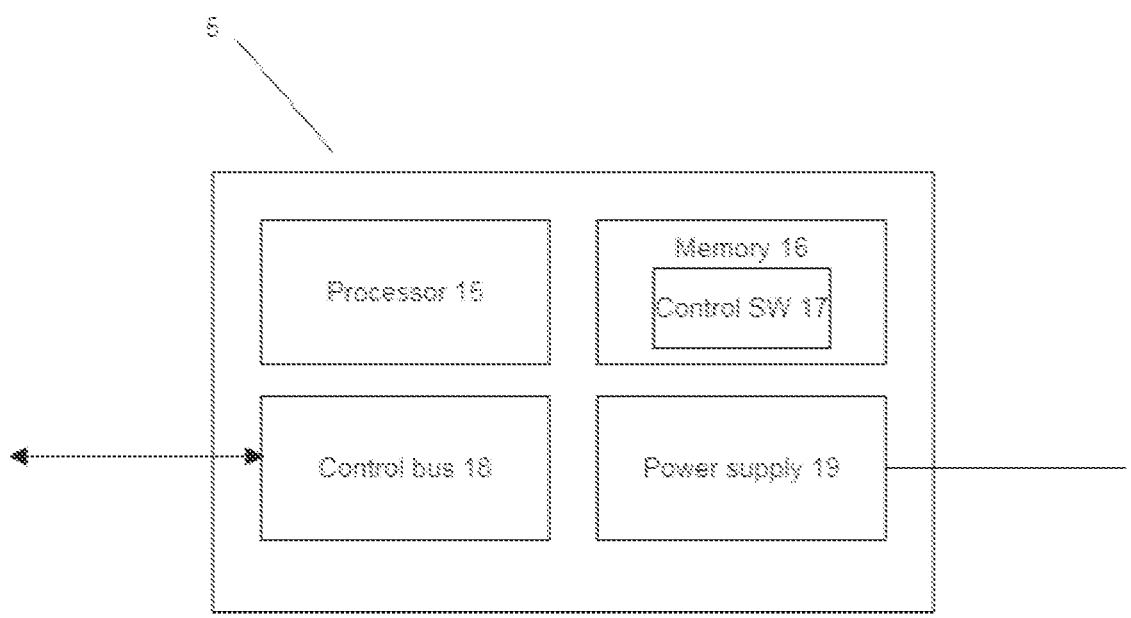
FIG. 4 is a block diagram of the components of one example of a controller in accordance with an illustrative embodiment of the invention disclosed herein.

FIG. 4 is a block diagram demonstrating the components of one embodiment of the controller 5 in accordance with the invention. There is shown a processor 15, memory 16 which contains various required processor instructions including the control software 17 for facilitation of the method of the invention, as well as a necessary power supply connection 19 to the power supply on the vehicle. A bus connector 18 is shown, which is one contemplated method of integration of the controller 5 into the remainder of the system of the vehicle 1. In other embodiments of vehicle 1, the controller 5 could be individually connected as required to the required components of the vehicle 1, namely the battery system and a sensor for groundspeed at a minimum where the behavior of the regenerative braking system was already known.

As used herein, the term "processor" or "computer" may refer, but is not limited to a laptop or desktop computer, or a mobile device, such as a desktop, laptop, tablet, cellular phone, smart phone, personal media user (e.g., iPod), wearable computer, implantable computer, or the like. Such computing devices may operate using one or more operating systems, including, but not limited to, Windows, MacOS, Linux, Unix, iOS, Android, Chrome OS, Windows Mobile, Windows CE, Windows Phone OS, Blackberry OS, and the like.

The devices, systems and methods described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or methods described herein, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each process described above and combinations thereof may be embodied in computer executable code that, when executing on one or more computing devices, performs the steps thereof. In another aspect, the processes may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the instant disclosure may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of dynamic speed modulation in a battery-powered electric vehicle, the method comprising the steps of:
   determining, by a processor, a sensed parameter of a rechargeable battery of the battery-powered electric vehicle;
   determining, by a processor, a threshold of the rechargeable battery; and performing, by the processor:
      when the sensed parameter of the rechargeable battery is less than the threshold, determining a change in the sensed parameter by recharging power generated by the regenerative braking system at the groundspeed of the vehicle, and performing, by the processor, one of;
         a. when the change causes the sensed parameter to reach or exceed the threshold, decreasing, by using the friction brake, the groundspeed of the vehicle to a second groundspeed at which the change causes the sensed parameter to approximate but not exceed the threshold; and
b. when the change causes the sensed parameter to remain within the threshold, decreasing the groundspeed of the vehicle to a third groundspeed at which the change caused by the regenerative braking system causes the sensed parameter to approximate but not exceed the threshold of the battery and which does not exceed a maximum operating groundspeed, wherein:

the sensed parameter of the rechargeable battery comprises a temperature of the battery, the change comprises a change in temperature of the rechargeable battery caused by the regenerative braking system at the groundspeed of the vehicle, and the threshold of the rechargeable battery further comprises a maximum allowable temperature of the rechargeable battery.

2. The method of claim 1, wherein
the sensed parameter of the battery is a current energy level of the rechargeable battery,
the change comprises recharging power produced by the regenerative braking system at the groundspeed of the vehicle, and
the threshold of the rechargeable battery is a maximum energy level that the rechargeable battery contains, and
a difference between the maximum energy level and the current energy level of the rechargeable battery is a charging capacity of the rechargeable battery, or the amount of additional energy that the rechargeable battery is capable of receiving at a given time.

3. The method of claim 1 wherein the speed limit is 0 km/hr.

4. The method of claim 1 wherein the speed limit is 6 km/hr.

5. The method of claim 2 further comprises depleting excess recharging power at a charging resistor and decreasing the groundspeed of the vehicle once recharging power exceeds the charging capacity of the rechargeable battery and an amount of recharging power which the charging resistor receives and depletes.

6. The method of claim 1 wherein the battery-powered electric vehicle runs downhill.

7. A controller for use in association with a power system of a battery-powered electric vehicle to achieve dynamic speed modulation in extended braking applications, the controller configured for:
a) determining a sensed parameter of a rechargeable battery of the battery-powered electric vehicle;
b) determining a threshold of the rechargeable battery; and
c) performing:
when the sensed parameter of the rechargeable battery is less than the threshold, determining a change in the sensed parameter by recharging power generated by the regenerative braking system at the groundspeed of the vehicle, and performing one of
a. when the change causes the sensed parameter to reach or exceed the threshold, decreasing, by using a friction brake, the groundspeed of the vehicle to a second groundspeed at which the change causes the sensed parameter to approximate but not exceed the threshold of the battery; and
b. when the change causes the sensed parameter to remain within the threshold, decreasing the groundspeed of the vehicle to a third groundspeed at which the change caused by the regenerative braking system causes the sensed parameter to approximate but not exceed the threshold of the rechargeable battery and which does not exceed a maximum operating groundspeed;

wherein:

the sensed parameter of the rechargeable battery comprises a temperature of the rechargeable battery, the change comprises a change in temperature of the rechargeable battery caused by the regenerative braking system at the groundspeed of the vehicle, and the threshold of the rechargeable battery further comprises a maximum allowable temperature of the rechargeable battery.

8. The controller of claim 7 wherein
the sensed parameter of the rechargeable battery is current energy level of the rechargeable battery,
the change comprises the recharging produced by the regenerative braking system at the groundspeed of the vehicle, and
the threshold of the rechargeable battery is a maximum energy level that the rechargeable battery contains, and
a difference between the maximum energy level and the current energy level of the battery is a charging capacity of the battery, or the amount of additional energy the battery that is capable of receiving at a given time.

9. The controller of claim 7 wherein the speed limit is 0 km/hr.

10. The controller of claim 7 wherein the speed limit is 6 km/hr.

11. The controller of claim 8 further configured for depleting excess recharging power at a charging resistor, and decreasing the groundspeed of the vehicle once recharging power exceeds the charging capacity of the rechargeable battery and an amount of recharging power which the charging resistor receives and depletes.

12. The controller of claim 7 wherein the battery-powered electric vehicle runs downhill.

13. A battery-powered electric vehicle configured to achieve dynamic speed modulation in extended bra king applications, said vehicle comprising:
a. at least one electric motor operatively connected to a drive train of the vehicle;
b. a rechargeable battery for supply of power to the at least one electric motor; and
c. a regenerative braking system operatively connected to the at least one electric motor which progressively limits a groundspeed of the vehicle and provides recharging power to the battery; and
d. a controller for use in association with a power system of the vehicle comprising a processor and associated control software, being operatively connected to the power system of the electric vehicle, the controller configured for:
a. determining a sensed parameter of a rechargeable battery of the battery-powered electric vehicle;
b. determining a threshold of the rechargeable battery; and
c. performing:
when the sensed parameter of the rechargeable battery is less than the threshold, determining a change in the sensed parameter by recharging power generated by the regenerative braking system at the groundspeed of the vehicle, and performing one of a. when the change causes the sensed parameter to reach or exceed the threshold, decreasing, by using a friction brake, the groundspeed of the vehicle to a second groundspeed at which the change causes the sensed parameter to approximate but not exceed the threshold of the battery; and b. when the change causes the sensed parameter to remain within the threshold, decreasing the groundspeed of the vehicle to a third groundspeed at which the change caused by the regenerative braking system causes the sensed parameter to approximate but not exceed the threshold of the rechargeable battery and which does not exceed a maximum operating groundspeed, wherein:

the sensed parameter of the rechargeable battery comprises a temperature of the rechargeable battery, the change comprises a change in temperature of the rechargeable battery caused by the regenerative braking system at the groundspeed of the vehicle, and the threshold of the battery is a maximum allowable temperature of the battery.

14. The vehicle of claim 13 wherein the sensed parameter of the rechargeable battery is a current energy level of the rechargeable battery, the change is the recharging power produced by the regenerative braking system at the groundspeed of the vehicle, and the threshold of the rechargeable battery is a maximum energy level that the rechargeable battery contains, and a difference between the maximum energy level and the current energy level of the battery is a charging capacity of the battery, or the amount of additional energy the battery that is capable of receiving at a given time.

15. The vehicle of claim 13 wherein the speed limit is 0 km/hr.

16. The vehicle of claim 13 wherein the speed limit is 6 km/hr.

17. The vehicle of claim 14 further configured for: depleting excess recharging power at a charging resistor, and decreasing the groundspeed of the vehicle once recharging power exceeds the charging capacity of the rechargeable battery and an amount of recharging power which the charging resistor receives and depletes.

18. The method of claim 1 further comprising the step of performing, by the processor, when the sensed parameter of the rechargeable battery is equal to or greater than the threshold, decreasing the groundspeed of the vehicle to a speed limit using the friction brake.

19. The controller of claim 7 further comprising the controller configured for performing when the sensed parameter of the rechargeable battery is equal to or greater than the threshold, decreasing the groundspeed of the vehicle to a speed limit using the friction brake.

20. The vehicle of claim 13 further comprising the controller configured for when the sensed parameter of the rechargeable battery is equal to or greater than the threshold, decreasing the groundspeed of the vehicle to a speed limit using the friction brake.

* * * * *